(12) United States Patent
Muramatsu et al.

(10) Patent No.: US 12,252,792 B2
(45) Date of Patent: Mar. 18, 2025

(54) ELECTRICAL STEEL SHEET HAVING INSULATING COATING

(71) Applicant: JFE STEEL CORPORATION, Tokyo (JP)

(72) Inventors: Naoki Muramatsu, Tokyo (JP); Nobuko Nakagawa, Tokyo (JP); Chiyoko Tada, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 720 days.

(21) Appl. No.: 17/430,626

(22) PCT Filed: Sep. 26, 2019

(86) PCT No.: PCT/JP2019/038026
§ 371 (c)(1),
(2) Date: Aug. 12, 2021

(87) PCT Pub. No.: WO2020/166121
PCT Pub. Date: Aug. 20, 2020

(65) Prior Publication Data
US 2022/0106689 A1    Apr. 7, 2022

(30) Foreign Application Priority Data

Feb. 14, 2019    (JP) .................................. 2019-024445

(51) Int. Cl.
C23C 22/20    (2006.01)
C09D 201/00    (2006.01)
C23C 22/00    (2006.01)

(52) U.S. Cl.
CPC ............ C23C 22/20 (2013.01); C09D 201/00 (2013.01)

(58) Field of Classification Search
CPC ....... C09D 201/00; C23C 22/20; C23C 22/22; C23C 22/74
See application file for complete search history.

(56) References Cited

U.S. PATENT DOCUMENTS

| | | | |
|---|---|---|---|
| 2013/0115443 A1 | 5/2013 | Takeda et al. | |
| 2013/0209789 A1 | 8/2013 | Takeda et al. | |
| 2014/0147661 A1 | 5/2014 | Yasuda et al. | |

FOREIGN PATENT DOCUMENTS

| | | | | |
|---|---|---|---|---|
| CA | 2803150 | * | 1/2012 | ............. C23C 22/00 |
| CA | 2803150 A1 | * | 1/2012 | ........... C09D 163/00 |
| CN | 102575352 A | | 7/2012 | |

(Continued)

OTHER PUBLICATIONS

Translation for JP 2013249486 (Year: 2013).*

(Continued)

*Primary Examiner* — Lois L Zheng
(74) *Attorney, Agent, or Firm* — Oliff PLC

(57) ABSTRACT

An electrical steel sheet having excellent coating peel resistance that can be exhibited during a stamping process, so that sticking of the coating to a die is inhibited. The electrical steel sheet has an insulating coating disposed on at least one surface of the electrical steel sheet. The insulating coating (i) includes a composite comprising P and Al, (ii) has an aspect ratio in a range of 1 to 10, and (iii) has a thickness in a range of 500 nm to 2000 nm. The composite has a particle diameter in a range of 10 nm to 1000 nm.

5 Claims, 1 Drawing Sheet

(56) References Cited

FOREIGN PATENT DOCUMENTS

| EP | 2 302 095 A1 | 3/2011 | | |
|----|----|----|----|----|
| EP | 2 479 315 A1 | 7/2012 | | |
| EP | 3 604 614 A1 | 2/2020 | | |
| JP | H05-78855 A | 3/1993 | | |
| JP | 2002-249881 A | 9/2002 | | |
| JP | 2010-261063 A | 11/2010 | | |
| JP | 4725094 B2 | 7/2011 | | |
| JP | 2011252191 A | 12/2011 | | |
| JP | 2012122118 A | 6/2012 | | |
| JP | 2013-249486 A | 12/2013 | | |
| JP | 5877252 B2 | 3/2016 | | |
| KR | 2011-0072848 | * | 6/2011 | ............. B32B 15/09 |
| TW | 201839169 A | 11/2018 | | |
| WO | 2009/154139 A1 | 12/2009 | | |
| WO | 2012/057168 A1 | 5/2012 | | |
| WO | 2016/104404 A1 | 6/2016 | | |
| WO | 2016/104407 A1 | 6/2016 | | |
| WO | 2016/104512 A1 | 6/2016 | | |

OTHER PUBLICATIONS

Oct. 5, 2020 Office Action issued in Taiwanese Patent Application No. 108136211.
Jul. 28, 2020 Office Action issued in Japanese Patent Application No. 2019-563909.
Jan. 19, 2021 Office Action issued in Japanese Patent Application No. 2019-563909.
Mar. 30, 2021 Decision of Refusal issued in Japanese Patent Application No. 2019-563909.
Mar. 30, 2021 Decision of Dismissal of Amendment issued in Japanese Patent Application No. 2019-563909.
Feb. 22, 2022 Extended Search Report issued in European Patent Application No. 19915318.0.
Jun. 16, 2023 Office Action issued in Korean Patent Application No. 10-2021-7024895.
Dec. 21, 2023 Office Action issued in Korean Patent Application No. 10-2021-7024895.
Feb. 23, 2023 Office Action issued in Chinese Patent Application No. 201980091928.6.
May 5, 2023 Office Action issued in Canadian Patent Application No. 3,125,898.
Aug. 1, 2022 Office Action issued in Chinese Patent Application No. 201980091928.6.
Nov. 12, 2019 International Search Report issued in International Application No. PCT/JP2019/038026.
Jul. 25, 2023 Office Action issued in Chinese Patent Application No. 201980091928.6.
Apr. 11, 2022 Office Action issued in Canadian Patent Application No. 3,125,898.
Nov. 3, 2022 Office Action issued in Canadian Patent Application No. 3,125,898.
Mar. 20, 2024 Canadian Office Action issued in Application No. 3,125,898.
Mar. 12, 2024 Office Action issued in Korean Patent Application No. 10-2021-7024895.

* cited by examiner

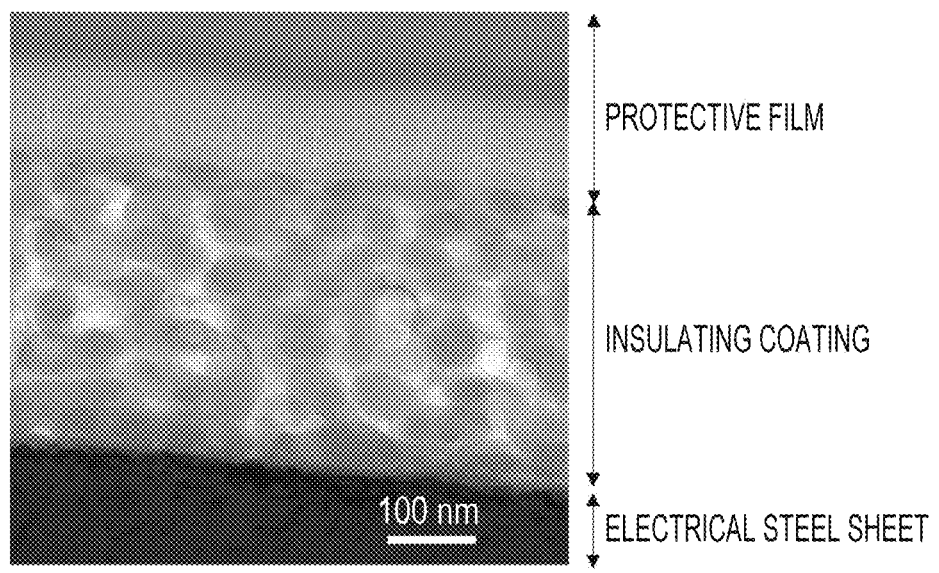

ELECTRICAL STEEL SHEET HAVING INSULATING COATING

TECHNICAL FIELD

This application relates to an electrical steel sheet having an insulating coating, the electrical steel sheet having excellent coating peel resistance such that the coating is prevented from peeling off the steel sheet during stamping process, and thus, sticking of the coating to a stamping die is inhibited.

BACKGROUND

Electrical steel sheets are used in various applications, and, therefore, a variety of insulating coatings suitable for different applications have been developed. When an electrical steel sheet is to be used as a core of a motor or the like, the electrical steel sheet is stamped into blanks having a predetermined shape, and thereafter the blanks are stacked and subjected to forming.

In blanking (stamping), punch oil is typically used for preventing galling in a die or cooling of a die. In recent years, however, an increasing number of customers, particularly in Europe, have been opting for oil-free stamping. A reason that the customers opt for oil-free stamping is that in an instance where punch oil is used, dust from the air, iron powder generated during stamping, or the like adheres to the oil and forms contaminants, which can clog a tube for a motor and gears. Successive stampings of an electrical steel sheet are performed at a very high speed, and, in many cases, several hundreds of thousands of shots are performed for one die maintenance cycle.

Accordingly, adhesion between the electrical steel sheet and an insulating coating is important. If the insulating coating is one that easily peels off when an impact is applied thereto during stamping, it is impossible to guarantee, in a case where the steel sheet is formed to be a core, insulation between the blanks of the steel sheet. In addition, if the insulating coating peels off during stamping, the peeled-off pieces of the insulating coating accumulate within the die and thus contaminate the die. In instances where punch oil is used, the peeled-off pieces of the insulating coating are washed away by the oil to some extent. However, in oil-free stamping, the insulating coating strongly adheres to the die and could cause a defect, such as an indentation, in a surface of the steel sheet.

Insulating coatings can be generally classified into (1) inorganic coatings, (2) resin-containing inorganic coatings (i.e., semi-organic coatings), and (3) organic coatings. In recent years, there have been many cases in which stress relief annealing at a temperature of approximately 700 to 800° C. for removing residual strain is performed; accordingly, (2) semi-organic coatings, which have excellent blankability due to the presence of the resin and is resistant to stress relief annealing, are typically used in many cases. For example, Patent Literature 1 proposes an electrical steel sheet having a chromium-free insulating coating, the insulating coating including a Zr compound and including phosphoric acid and/or a phosphate salt; the electrical steel sheet can form a product sheet (sheet before stress relief annealing) having excellent corrosion resistance, powdering resistance, and appearance and can form a stress relief annealed sheet having excellent scratch resistance. In the electrical steel sheet, the sum of a content of the Zr compound calculated as $ZrO_2$ and a content of the phosphoric acid and/or the phosphate salt calculated as $PO_4$ is 45 to 90 mass % relative to a mass of the total solids of the insulating coating; a ratio between the contents, which is a ratio of $PO_4/ZrO_2$, is 0.01 to 0.40; and the insulating coating includes an Al compound, a Si compound, or a titania sol as a balance component, which is a component other than the Zr compound or the phosphoric acid and/or the phosphate salt.

Furthermore, Patent Literature 2 proposes an insulating film composition of a non-oriented electrical steel sheet. The insulating film composition includes a mixed metal phosphate consisting of aluminum phosphate and cobalt phosphate; and an organic/inorganic composite consisting of epoxy resin and silica nanoparticle substituted on the functional group of the epoxy resin, with the size of the silica nanoparticle being 5 to 50 nm, wherein the mixing ratio by weight between the cobalt phosphate and aluminum phosphate (cobalt phosphate/aluminum phosphate) mixed in the mixed metal phosphate is 0.05 to 0.2.

Patent Literature 3 proposes an electrical steel sheet in which an insulating film contains a phosphate of one or more selected from the group consisting of Al, Zn, Mg and Ca, wherein a proportion of an amount by mole (mol) of Fe atoms relative to an amount by mole (mol) of P atoms in the insulating film is more than 0.1 and not more than 0.65. Patent Literature 4 proposes an electrical steel sheet in which an insulating film contains a phosphate of one or more selected from the group consisting of Al, Zn, Mg and Ca, wherein the phosphate exhibits a specific peak having a top within a range of −26 ppm to −16 ppm in a solid $^{31}$P-NMR spectrum, and a proportion of an integrated intensity of the specific peak relative to an integrated intensity of all peaks in the solid $^{31}$P-NMR spectrum is 30% or more.

Patent Literature 5 proposes an electrical steel sheet in which predetermined conditions are satisfied in a region of 50 area % or more of a cross section parallel to a thickness direction of the insulating film.

CITATION LIST

Patent Literature

PTL 1: Japanese Patent No. 4725094
PTL 2: Japanese Patent No. 5377252
PTL 3: International Publication No. 2016/104407
PTL 4: International Publication No. 2016/104512
PTL 5: International Publication No. 2016/104404

SUMMARY

Technical Problem

According to Patent Literature 1 or 2, general properties necessary for an insulating coating can be satisfied; however, in Patent Literature 1 or 2, no reference is made to a coating peel property that can be exhibited during stamping process, or, sticking properties associated with a die. According to Patent Literature 3, 4, or 5, good anti-rust properties can be achieved; however, in Patent Literature 3, 4, or 5, no discussion is made regarding a coating peel property that can be exhibited during stamping process, or, sticking to a die. In particular, in instances where oil-free stamping is performed, a concern arises that peeled-off pieces of the coating (peeled coating) may accumulate within a die and stick to the die.

The disclosed embodiments were made in view of the above circumstances. An object of the disclosed embodiments is to provide an electrical steel sheet having an insulating coating, the electrical steel sheet having excellent coating peel resistance that can be exhibited during stamping process, so that sticking of the coating to a die is inhibited.

Solution to Problem

The inventors diligently performed studies to solve the problems described above and discovered that, by including a composite in the insulating coating, peeling of the coating during stamping process can be significantly reduced, and, therefore, sticking thereof to a die can be inhibited; the composite contains P and Al and has a predetermined aspect ratio and particle diameter.

The disclosed embodiments are based on the knowledge described above. Specifically, a summary of features of the disclosed embodiments is as follows.

[1] An electrical steel sheet having an insulating coating, including an electrical steel sheet and an insulating coating disposed on at least one of surfaces of the electrical steel sheet, wherein the insulating coating includes a composite containing P and Al and having an aspect ratio of 1 to 10, the composite has a particle diameter of 10 nm to 1000 nm, and the insulating coating has a thickness of 500 nm to 2000 nm.

[2] The electrical steel sheet having an insulating coating according to [1], wherein the insulating coating includes an organic resin.

Advantageous Effects

With the disclosed embodiments, an electrical steel sheet having an insulating coating is provided, the electrical steel sheet having excellent coating peel resistance that can be exhibited during stamping process, so that sticking of the coating to a die is inhibited.

BRIEF DESCRIPTION OF THE DRAWINGS

FIG. 1 is a TEM image of an electrical steel sheet having an insulating coating of the disclosed embodiments, the TEM image showing a cross section of the insulating coating.

DETAILED DESCRIPTION

Disclosed embodiments will be described below. It will be understood that the disclosure is not intended to be limited to these specific embodiments.

The electrical steel sheet that is used in the disclosed embodiments is not limited to a particular electrical steel sheet. Examples of the electrical steel sheets include electrical steel sheets having a typical chemical composition. Examples of components included in a typical electrical steel sheet include Si and Al. Furthermore, the balance of the electrical steel sheet is Fe and incidental impurities. Typically, it is preferable that a Si content be within a range of 0.05 to 7.0 mass %, and an Al content be within a range of 2.0 mass % or less.

In an electrical steel sheet having an insulating coating of the disclosed embodiments, the insulating coating includes a composite containing P and Al and having an aspect ratio of 1 to 10.

The present inventors diligently performed studies to improve a coating peel property that can be exhibited during stamping process. As a result, it was discovered that in cases where the composite containing P and Al has a predetermined shape and a predetermined particle diameter, good coating peel resistance can be exhibited even in severe stamping process. A reason for the improvement in the coating peel resistance is believed to be that when the composite has a predetermined shape and a predetermined particle diameter, sufficient progression of the bonding between P atoms and Al atoms has been achieved, which increases a strength of the coating.

FIG. 1 is a TEM image of a cross section of an insulating coating of the disclosed embodiments. For the TEM image of the cross section, a thin film sample was introduced into a transmission electron microscope (FE-TEM instrument: HF2100, manufactured by Hitachi High-Technologies Corporation), and image observation was performed. Furthermore, the coating portion was analyzed by using an energy dispersive X-ray spectrometer (EDX analyzer: Noran System Six, manufactured by Thermo Fisher Scientific) attached to the TEM instrument. Note that the thin film sample was prepared as follows: a sample was introduced into an FIB system (FB-2100, manufactured by Hitachi High-Technologies Corporation); a C-CVD film, which was a protective film, was then deposited on the coating; and subsequently, the preparation was performed by using a micro-sampling unit included in the FIB system. FIG. 1 shows the existence of particles in the insulating coating, as indicated by gray elliptical portions, which are the composite. EDX analysis confirmed that the particles in the insulating coating were a composite containing P and Al.

The insulating coating of the disclosed embodiments will be described below.

The composite of the disclosed embodiments contains P and Al. As referred to in the disclosed embodiments, the "composite" is an assembly of inorganic components that are integrated at an atomic or a molecular level, and the composite may contain one or more other components, in addition to P and Al. By virtue of the P and Al included in the composite, particles of the composite can readily form a network together, which results in the formation of a rigid coating.

An example of a method for including P and Al in the composite of the insulating coating of the disclosed embodiments is as follows: aluminum phosphate is added to a coating liquid that is to be applied to an electrical steel sheet (a treatment liquid for forming the insulating coating). A combination of phosphoric acid or a phosphate salt with an Al compound may be used. The phosphate salt that can be used in the disclosed embodiments may be an industrially available product and is not particularly limited. Preferred examples include orthophosphoric acid, anhydrous phosphoric acid, linear polyphosphoric acid, and cyclic metaphosphoric acid. Preferably, the phosphate salt may be a water-soluble salt, such as monomagnesium phosphate or monocalcium phosphate. These phosphoric acids and phosphate salts may be used alone or in a combination of two or more. Preferably, the Al compound may be an Al compound containing a hydroxy group and organic acid, or, a dehydrated product thereof. Examples of the Al compound include alumina sols. The Al compound may be one that is soluble in water or dispersible in water in the form of a colloid or a suspension. This is preferable because the coating liquid to be applied to the steel sheet for baking is to be an aqueous coating liquid. Furthermore, the Al compound may have any shape, and examples of the shape include feathery shapes and spherical shapes.

Furthermore, the composite in the Insulating coating of the disclosed embodiments has an aspect ratio (a major axis/a minor axis) within a range of 1 to 10. If the aspect ratio is greater than 10, it is difficult to densely fill the insulating coating with the composite, and as a result, the strength of the coating decreases, and the coating peel resistance is significantly degraded. Note that the aspect ratio is preferably less than or equal to 4.

The composite in the insulating coating of the disclosed embodiments, which contains P and Al, has a particle diameter of 10 nm to 1000 nm. If the particle diameter is less than 10 nm, the bonding between P atoms and Al atoms is not sufficiently formed, and as a result, the coating peel resistance is degraded. On the other hand, if the particle diameter is greater than 1000 nm, adhesion between the composite and the steel sheet is degraded, and as a result, the coating peel resistance is reduced. Note that the particle diameter is preferably greater than or equal to 50 nm and less than or equal to 500 nm.

The aspect ratio and the particle diameter of the composite in the insulating coating of the disclosed embodiments can be determined as follows, for example. A thin film sample of the insulating coating is prepared by FIB processing, and a cross section of the insulating coating is observed with a TEM at a magnification of 30,000×. The aspect ratios and the particle diameters of all of the particles of the composite in three fields of view are determined, and the arithmetic means of the values are determined. Note that the aspect ratio is determined as follows: in the TEM observation, the lengths of the major axis and the minor axis of the particles of the composite are measured, and the aspect ratio is calculated as "major axis/minor axis". The particle diameter is an average particle diameter calculated as follows: (major axis+minor axis)/2. Furthermore, the presence of P and Al in the composite can be confirmed by performing EDX analysis.

Furthermore, as will be described later, the aspect ratio and the particle diameter of the composite in the insulating coating of the disclosed embodiments can be controlled through a baking temperature (PMT), which is a temperature used for performing baking after the treatment liquid for forming the insulating coating is applied onto the steel sheet.

The insulating coating of the disclosed embodiments has a thickness of 500 nm to 2000 nm. If the thickness is less than 500 nm, insulation of a projecting portion of the steel sheet cannot be guaranteed. If the thickness is greater than 2000 nm, an amount of peeling of the insulating coating during stamping process increases; as a result, an amount of peeled coating that accumulates in the die increases, and, therefore, a stamping process property is adversely affected. The thickness can be determined by observing a cross section of the insulating coating revealed by cleaving, by using an SEM. This method is a non-limiting example. Note that the thickness of the insulating coating is preferably greater than or equal to 700 nm and less than or equal to 1500 nm.

The insulating coating of the disclosed embodiments may include an organic resin. Including an organic resin in the insulating coating further enhances performance of the coating. Organic resins that can be used in the disclosed embodiments are not particularly limited, and any of known organic resins that are used in the related art may be advantageously employed. Examples thereof include aqueous resins (emulsions, dispersions, and water-soluble resins), such as those of an acrylic resin, an alkyd resin, a polyolefin resin, a styrene resin, a vinyl acetate resin, an epoxy resin, a phenolic resin, a polyester resin, a urethane resin, and a melamine resin. In particular, an emulsion of an acrylic resin and an emulsion of an ethylene-acrylic acid resin are preferable. In cases where an organic resin is included, corrosion resistance is enhanced. In addition, during stamping process, the organic resin protects the die, and, therefore, lubricity during stamping process is enhanced; as a result, an effect of inhibiting degradation of the cutting edge of the stamping die can be expected.

Furthermore, in the disclosed embodiments, the insulating coating may include, in addition to the components described above, one or more other components, a commonly used additive, such as surfactants, corrosion inhibitors, lubricants and antioxidants, and other inorganic compound or organic compound. Note that examples of the organic compound include an organic acid, which may be used as an inhibitor that inhibits contact between the inorganic component and the organic resin. Examples of the organic acid include acrylic-acid-containing polymers or copolymers. Examples of the inorganic compound include boric acid and pigments.

Now, a method for manufacturing the electrical steel sheet having an insulating coating will be described.

The electrical steel sheet with which the electrical steel sheet having an insulating coating is to be manufactured may be a common electrical steel sheet as described above. Accordingly, an electrical steel sheet manufactured by a common method or a commercially available electrical steel sheet may be employed.

In the disclosed embodiments, no particular limitations are imposed on a pretreatment of the electrical steel sheet, which is the base material. That is, the electrical steel sheet may be untreated; however, it is advantageous to subject the electrical steel sheet to a degreasing treatment that uses, for example, alkali, and/or to a pickling treatment that uses, for example, hydrochloric acid, sulfuric acid, or phosphoric acid.

Subsequently, a treatment liquid to be used to form the insulating coating is prepared. The treatment liquid can be prepared, for example, by adding monoaluminum phosphate to deionized water. Note that the treatment liquid may be adjusted by adding, as necessary, phosphoric acid, a phosphate salt, an alumina sol, an organic resin, or other component to deionized water.

In the preparation of the treatment liquid, it is preferable that an adjustment be made such that a solids concentration of the treatment liquid be within a range of 10% or greater and 50% or less. In the case where the solids concentration of the treatment liquid is within the range of 10% or greater and 50% or less, the aspect ratio of the composite in the insulating coating falls within a range desired in the disclosed embodiments. For this reason, such a solids concentration is preferable.

Subsequently, the treatment liquid is applied to a surface of the electrical steel sheet. Methods for applying the treatment liquid to the surface of the electrical steel sheet are not particularly limited, and any of a variety of methods that are industrially commonly used may be employed; examples of such methods include those using a roll coater, a flow coater, a spray, or a knife coater.

Subsequently, baking is performed on the treatment liquid that has been applied onto the electrical steel sheet, so that the insulating coating is formed from the applied treatment liquid. Methods for the baking are not particularly limited, and a method that is typically implemented may be employed; examples of the method include methods using hot air heating, methods using infrared radiation, and methods using induction heating. The baking temperature (PMT) for the baking is important in controlling the particle diameter of the composite of the insulating coating. In the disclosed embodiments, it is preferable to set the baking temperature (PMT) to be within a range of 200° C. or greater and 350° C. or less. If the baking temperature (PMT) is less than 200° C., the bonding between P and Al in the composite is not sufficiently formed; as a result, the coating peel resistance is reduced, and the desired particle diameter is not satisfied. Furthermore, if the baking temperature (PMT) is greater than 350° C., cracks (microcracks) form in the insulating coating as a result of the excessive baking, and the portions with cracks are highly susceptible to peeling of the coating; therefore, the coating peel resistance is significantly degraded. A baking time is not particularly limited, and, for example, a time within a range of 1 second to 10 minutes may be appropriately selected.

The electrical steel sheet having an insulating coating of the disclosed embodiments may be subjected to stress relief annealing so that strain due to blanking, for example, can be removed. Preferred examples of an atmosphere for the stress relief annealing include atmospheres in which iron is unlikely to be oxidized, such as $N_2$ atmospheres and DX gas atmospheres. In this regard, a dew point (Dp) may be set to be a high Dp temperature of, for example, approximately 5 to 60° C. to allow the surface and the cut edge surfaces to be slightly oxidized, which further enhances the corrosion resistance. Furthermore, a temperature for the stress relief annealing is preferably 700 to 900° C. and more preferably 700 to 800° C. A longer holding time at the temperature for the stress relief annealing is preferable. More preferably, the holding time is greater than or equal to 1 hour.

It is preferable that the insulating coating be provided on both surfaces of the electrical steel sheet. For some purposes, the insulating coating may be provided only on one of the surfaces. Furthermore, for some purposes, the insulating coating may be provided on only one of the surfaces, and a different insulating coating may be provided on the other surface.

EXAMPLES

Treatment liquids were prepared as follows. At least one of phosphoric acid, phosphate salts, and an alumina sol, listed in Table 0.1, were added to deionized water; optionally, an organic resin, listed in Table 1, was also added. The solids concentration of each of the treatment liquids was as shown in Table 2.

Each of the treatment liquids was applied to a surface of a test specimen by using a roll coater, and baking was performed in a hot-air baking oven at a baking temperature (PMT) for a baking time as shown in Table 2. The test specimen was one cut from an electrical steel sheet [A360 (JIS C2552(2000))] having a sheet thickness of 0.35 mm and had a size of 150 mm in width and 300 mm in length. After baking, the test specimen was allowed to cool to room temperature, and, accordingly, an insulating coating was formed.

The thickness of the insulating coating was measured by observing a cross section of the coating revealed by cleaving, by using an SEM. Furthermore, the particle diameter and the aspect ratio of the composite were determined by performing TEM observation of a thin film sample, which was prepared by FIB processing. Note that the particle diameter and the aspect ratio of the composite were measured in accordance with the method described above.

Furthermore, the coating peel resistance of the electrical steel sheet having an insulating coating was investigated. The evaluation method and the evaluation criteria are described below in detail.

<Coating Peel Resistance>

To investigate the coating peel property that can be exhibited during stamping process, a stamping test using a stamping machine was conducted on the above-described test specimen of the electrical steel sheet, on which an insulating coating had been formed. The stamping machine used was a hydraulic bench press AP-5KL, manufactured by Atsugi Motor Parts Co., Ltd. The die was made of SKD-11 and had a die diameter of φ100 mm. A sample measuring 20 mm×100 nm was cut. A pressure during the stamping was 4.5 kN, a holding time was 0.5 s/run, a press speed was 36 mm/s, and the number of times of stamping was 500. The surface of the die was polished with sandpaper in advance such that the surface had a roughness Ra of 0.03 μm. After the test, the surface of the sample was observed, and evaluations were made based on an area fraction of the peeled-off pieces of the coating. For the observation, a microscope DSX510, manufactured by Olympus Corporation, was used.

(Criteria)

⊙: The area fraction of peeling was 0% or greater and less than 101.

○: The area fraction of peeling was 10% or greater and less than 20%.

x: The area fraction of peeling was 20% or greater.

The results are shown in Table 2.

TABLE 1

| Symbol | Designation | Class | Trade name |
|--------|-------------|-------|------------|
| P1 | orthophosphoric acid | phosphoric acid | Phosphoric Acid (Mitsui Chemicals) |
| P2 | monoaluminum phosphate | phosphate salt | 50 L (Taki Chemical) |
| P3 | monomagnesium phosphate | phosphate salt | Monomagnesium Phosphate (Taihei Chemical Industrial) |
| P4 | monocalcium phosphate | phosphate salt | Monocalcium Phosphate (Mitejima Chemical) |
| A1 | alumina sol | alumina sol | AS-520-A (Nissan Chemical) |
| R1 | acrylic resin | organic resin | Voncoat (DIC) |
| R2 | epoxy resin | organic resin | EFD-5560 (DIC) |

TABLE 2

| | Insulating coating | | | | | | | | | | | | Coating property |
|---|---|---|---|---|---|---|---|---|---|---|---|---|---|
| | Inorganic component | | | | | | | | | Solids | | | Area |
| | Compound used in treatment liquid | | | | | Particle diameter of composite | Aspect ratio of | Organic resin | Thick-ness | concentration of treatment liquid | Baking temperature | Baking time | fraction of peeled coating |
| No. | P1 | P2 | P3 | P4 | A1 | (nm) | composite | Type | (nm) | (%) | (° C.) | (s) | (%) |
| Example 1 | | ○ | | | | 10 | 2 | — | 1000 | 18 | 240 | 20 | ○ |
| Example 2 | | ○ | | | | 50 | 2 | — | 1000 | 18 | 270 | 20 | ⊙ |
| Example 3 | | ○ | | | | 100 | 2 | — | 1000 | 18 | 320 | 20 | ⊙ |
| Example 4 | | ○ | | | | 500 | 2 | — | 1000 | 18 | 340 | 20 | ⊙ |
| Example 5 | | ○ | | | | 1000 | 2 | — | 1000 | 36 | 350 | 20 | ○ |
| Example 6 | | ○ | | | | 100 | 1 | — | 1000 | 10 | 320 | 20 | ⊙ |
| Example 7 | | ○ | | | | 100 | 5 | — | 1000 | 18 | 320 | 20 | ○ |
| Example 8 | | ○ | | | | 100 | 10 | — | 1000 | 50 | 320 | 20 | ○ |
| Example 9 | | ○ | | | | 100 | 2 | R1 | 1000 | 18 | 320 | 20 | ⊙ |
| Example 10 | | ○ | | | | 100 | 2 | R2 | 1000 | 18 | 320 | 20 | ⊙ |
| Example 11 | | ○ | | | | 100 | 2 | — | 500 | 18 | 320 | 20 | ⊙ |
| Example 12 | | ○ | | | | 100 | 2 | — | 2000 | 18 | 320 | 20 | ○ |
| Example 13 | | | ○ | | ○ | 100 | 2 | — | 1000 | 18 | 320 | 20 | ⊙ |
| Example 14 | | | | ○ | ○ | 100 | 2 | — | 1000 | 18 | 320 | 20 | ⊙ |
| Example 15 | ○ | | ○ | | ○ | 100 | 2 | — | 1000 | 18 | 320 | 20 | ⊙ |
| Example 16 | ○ | | | ○ | ○ | 100 | 2 | — | 1000 | 18 | 320 | 20 | ⊙ |
| Example 17 | ○ | | | | ○ | 100 | 2 | — | 1000 | 18 | 320 | 20 | ⊙ |
| Comparative example 1 | | ○ | | | | 5 | 2 | — | 1000 | 18 | 180 | 20 | X |
| Comparative example 2 | | ○ | | | | 1500 | 2 | — | 1000 | 50 | 360 | 20 | X |
| Comparative example 3 | | ○ | | | | 100 | 15 | — | 1000 | 60 | 320 | 20 | X |
| Comparative example 4 | | ○ | | | | 100 | 2 | — | 2500 | 18 | 320 | 20 | X |
| Comparative example 5 | ○ | | | | | 100 | 2 | — | 1000 | 18 | 320 | 20 | X |
| Comparative example 6 | | | | | ○ | 100 | 2 | — | 1000 | 18 | 320 | 20 | X |

From the results shown in Table 2, it is apparent that all of the Examples were excellent in terms of performance of the coating.

The invention claimed is:

1. An electrical steel sheet comprising an insulating coating disposed on at least one surface of the electrical steel sheet,
    wherein the insulating coating (i) includes a composite comprising P and Al, (ii) is formed by baking a coating composition that includes (a) alumina sol and monomagnesium phosphate, (b) alumina sol and monocalcium phosphate, (c) alumina sol, orthophosphoric acid, and monomagnesium phosphate, (d) alumina sol, orthophosphoric acid, and monocalcium phosphate, or (e) alumina sol and orthophosphoric acid; and (iii) has a thickness in a range of 500 nm to 2000 nm, and the composite has an aspect ratio in a range of 1 to 10 and a particle diameter in a range of 10 nm to 1000 nm.

2. The electrical steel sheet according to claim 1, wherein the insulating coating is formed by baking a coating composition that includes (a) alumina sol and monomagnesium phosphate, (b) alumina sol and monocalcium phosphate, (c) alumina sol, orthophosphoric acid, and monomagnesium phosphate, or (d) alumina sol, orthophosphoric acid, and monocalcium phosphate.

3. The electrical steel sheet according to claim 1, wherein the insulating coating further includes an organic resin.

4. The electrical steel sheet according to claim 1, wherein the particle diameter is in a range of from 50 nm to 500 nm.

5. The electrical steel sheet according to claim 1, wherein the aspect ratio is in a range of from 1 to 4.

* * * * *